(12) United States Patent
Heuschmid et al.

(10) Patent No.: US 7,686,327 B2
(45) Date of Patent: Mar. 30, 2010

(54) AIRBAG ARRANGEMENT

(75) Inventors: Rainer Heuschmid, Kammel (DE); Georg Rasch, Bibertal-Bühl (DE)

(73) Assignee: Takata-Petri AG, Aschaffenburg (DE)

( * ) Notice: Subject to any disclaimer, the term of this patent is extended or adjusted under 35 U.S.C. 154(b) by 1424 days.

(21) Appl. No.: 10/494,285

(22) PCT Filed: Oct. 28, 2002

(86) PCT No.: PCT/DE02/04060

§ 371 (c)(1), (2), (4) Date: Dec. 1, 2004

(87) PCT Pub. No.: WO03/039919

PCT Pub. Date: May 15, 2003

(65) Prior Publication Data

US 2005/0087959 A1 Apr. 28, 2005

(30) Foreign Application Priority Data

| Nov. 2, 2001 | (DE) | ................................. 101 55 357 |
| Dec. 19, 2001 | (DE) | ................................. 101 64 519 |
| Apr. 29, 2002 | (DE) | ............................. 202 07 388 U |

(51) Int. Cl.
    *B60R 21/20* (2006.01)
(52) U.S. Cl. ...................... 280/729; 280/738; 280/743.2
(58) Field of Classification Search ................ 280/729, 280/738, 743.2
    See application file for complete search history.

(56) References Cited

U.S. PATENT DOCUMENTS

| 5,172,933 | A |   | 12/1992 | Strasser |         |
|-----------|---|---|---------|----------|---------|
| 5,249,824 | A | * | 10/1993 | Swann et al. | ................ 280/729 |
| 5,560,649 | A |   | 10/1996 | Saderholm et al. |   |
| 5,918,902 | A |   | 7/1999  | Acker et al. |   |
| 5,931,497 | A |   | 8/1999  | Fischer |   |
| 5,951,038 | A | * | 9/1999  | Taguchi et al. | ............... 280/729 |
| 6,059,312 | A |   | 5/2000  | Staub et al. |   |
| 6,086,092 | A | * | 7/2000  | Hill | .............................. 280/729 |
| 6,247,727 | B1 |  | 6/2001  | Hamada et al. |   |
| 6,382,662 | B1 | * | 5/2002 | Igawa | ........................... 280/729 |
| 6,419,267 | B1 | * | 7/2002 | Hashimoto et al. | ........ 280/743.1 |
| 6,554,313 | B2 | * | 4/2003 | Uchida | ........................ 280/729 |
| 6,598,903 | B2 | * | 7/2003 | Okada et al. | .............. 280/743.2 |
| 6,648,366 | B2 | * | 11/2003 | Dillon et al. | ................. 280/729 |
| 6,648,371 | B2 | * | 11/2003 | Vendely et al. | .............. 280/739 |
| 6,834,884 | B2 | * | 12/2004 | Gu | ............................... 280/729 |
| 7,264,268 | B2 | * | 9/2007 | Ehrke | ........................... 280/729 |

(Continued)

FOREIGN PATENT DOCUMENTS

DE          296 09 703 U1      11/1996

(Continued)

*Primary Examiner*—Toan C To
(74) *Attorney, Agent, or Firm*—Foley & Lardner LLP

(57) ABSTRACT

The invention relates to an airbag arrangement, comprising a gas bag, a gas generator for inflating the gas bag, a flexible chamber arranged within the gas bag, into which the gas from the gas generator flows, at least one outlet opening through which the gas is led into the gas bag in order to inflate the same and at least one ventilating opening, through which gas can escape into the environment. According to the invention, the ventilating opening (E) is arranged such that gas from the flexible chamber (2) can reach the ventilating opening (E) without passing through the outlet opening of the flexible chamber (2).

28 Claims, 9 Drawing Sheets

U.S. PATENT DOCUMENTS

2001/0007391 A1    7/2001    Hamada et al.
2002/0047253 A1    4/2002    Rasch et al.

FOREIGN PATENT DOCUMENTS

| | | |
|---|---|---|
| DE | 198 56 407 A1 | 6/1999 |
| DE | 198 47 854 A1 | 4/2000 |
| DE | 201 05 734 U1 | 8/2001 |
| DE | 100 18 170 A1 | 10/2001 |
| EP | 0 800 963 A1 | 10/1997 |
| EP | 0 810 126 B1 | 12/1997 |
| JP | 1-311930 | 12/1989 |
| JP | 04244453 A | 9/1992 |
| JP | 5-213143 | 8/1993 |
| JP | 11-245757 | 9/1999 |
| WO | WO 98/58823 A1 | 12/1998 |
| WO | WO 99/28163 A1 | 6/1999 |
| WO | WO 03/039919 A1 | 5/2003 |

* cited by examiner

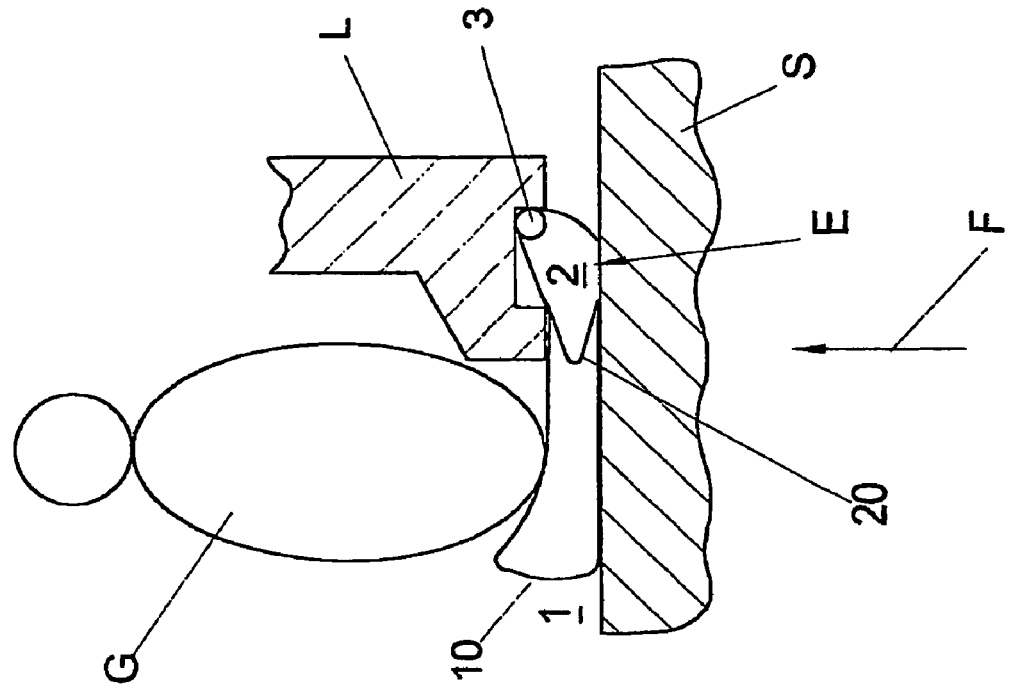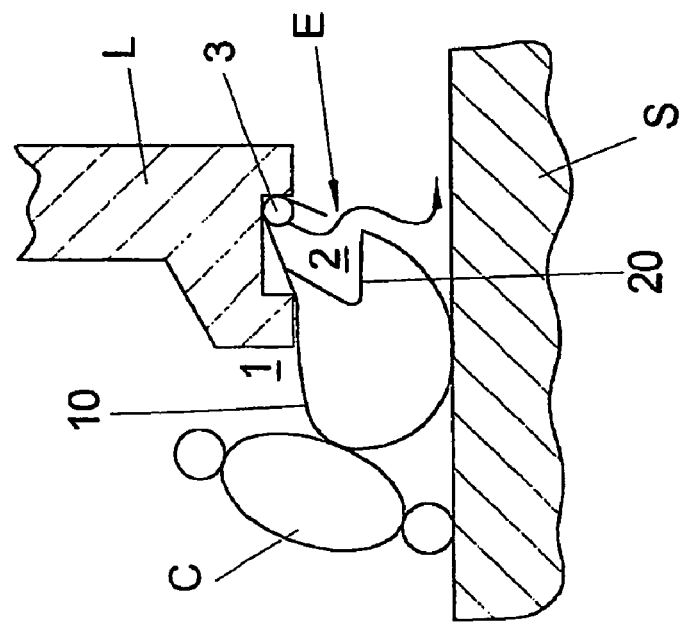

AIRBAG ARRANGEMENT

BACKGROUND

The application relates to an airbag arrangement.

Such an airbag arrangement includes a gas bag, a gas generator to inflate the airbag, a flexible chamber arranged within the gas bag, into which the gas issuing from the gas generator enters and which has at least one outlet opening through which the gas is carried on into a working space of the gas bag, as well as at least one vent opening through which the gas can exit from the gas bag into the environment.

The gas bag of such an airbag arrangement serves to protect occupants of the vehicle in an accident, and for this purpose the gas bag is inflated within a few milliseconds in order to form a cushion for an occupant, with which the occupant can collide. Since a vehicle occupant is not always in his normal (upright) sitting position while traveling, but for example may be leaning toward the airbag arrangement or leaning to one side, it is necessary to minimize the risk of injury to an occupant by means of the rapidly expanding gas bag. This purpose is served especially by controlling the gas stream which issues from the associated gas generator of the airbag system for the defined filling of the gas bag.

In WO 99/28163 A1 there is disclosed an apparatus for affecting the deployment of a gas bag of an airbag module, in which a passage is arranged within the gas bag in the region of the gas generator and has front discharge openings opposite one another to influence the outflowing gas after the gas generator is ignited. This passage can be formed especially by a rebound strap arranged within the gas bag. The guidance passage is therefore a flexible chamber into which the gas issuing from the gas generator first enters and by means of which the gas is introduced in defined, predetermined directions into the gas bag. In this manner the gas flow can be influenced within the gas bag such that the stress on a person who is out of his normal position when the gas bag is inflated is reduced (a so-called "oops" case.

SUMMARY

The invention is addressed to the problem of further improving an airbag arrangement of the kind referred to above.

This problem is solved by the invention through the creation of an airbag arrangement with the characteristics of claim 1.

Accordingly, the vent opening is arranged such that gas comes from the flexible chamber to the vent opening without passing the outlet openings of the flexible chamber, and does so preferably exclusively in such a manner that the gas in this case does not pass through the outlet openings.

Since the gases issuing from the gas generator first enter the flexible chamber which is arranged within the gas bag and whose capacity is definitely smaller than the total gas bag volume, a very high pressure develops upon the inflation of the gas bag which is definitely above the internal pressure in the inflating gas bag. Due to this very high pressure acting on the walls of the flexible chamber, a correspondingly strong gas flow takes place through the vent opening into the exterior (gas bag environment).

The solution according to the invention has the advantage that the very great pressure building up within the flexible chamber can be used in order to achieve an accelerated flow of gas out of the gas bag into the environment. This effect is naturally enhanced if the deployment of the gas bag is impaired by an occupant who is not in the normal position. This decreases the stress on an occupant upon colliding with the airbag in an "oops" situation.

Thus the contradictory requirements are brought into harmony by the fact that a gas bag in case of a collision is to be inflated to the greatest possible volume very quickly, and on the other hand the endangerment of the passenger by the inflating gas bag is to be minimized. According to the solution offered by the invention the pressure building up in the flexible chamber is on the one hand used for the purpose of filling the gas bag with gas as quickly as possible (through the outlet opening provided for the purpose in the flexible chamber) in a defined direction, which results in a correspondingly rapid deployment of the gas bag, and on the other hand the elevated pressure within the flexible chamber on account of the arrangement of the vent opening provided by the invention produces a more rapid outflow of gas into the environment, so that at the same time the stress on a vehicle occupant colliding with the gas bag can be reduced.

This is accomplished by the fact that gas issuing from the gas generator into the flexible chamber of the gas bag can exit through the vent opening without the need for first passing into a gas bag area situated outside of the flexible chamber (the so-called working area of the gas bag). For this purpose the venting opening is advantageously arranged in a wall of the flexible chamber.

To delimit the flexible chamber from the other areas within the gas bag, i.e., especially from the working area which serves to protect an occupant in case of a collision, a flexible envelope disposed within the gas bag can be used.

According to an embodiment this flexible envelope forms all walls of the flexible chamber, [and] completely envelops as the chamber—aside from the outflow openings. In another embodiment, the walls of the flexible chamber are formed partly by the flexible envelope arranged within the gas bag and partly by the envelope of the gas bag itself.

Depending on the configuration of the internal flexible envelope, the vent opening can be formed on the one hand exclusively by a opening in the envelope of the gas bag and on the other hand by openings in the flexible envelope, serving for venting and corresponding to one another. In the latter case the openings in the flexible envelope on the one hand and in the envelope of the gas bag on the other are to be arranged such that gas passes from the flexible chamber through the opening in the flexible envelope to the corresponding opening in the opening of the gas bag, without passing through the outflow openings of the flexible chamber (through which the gas would flow into the working portion of the gas bag).

The opening in the internal flexible envelope which serves for the venting, and the corresponding opening in the envelope of the gas bag, preferably match one another such that when the flexible chamber is in the inflated state and the gas bag is in the inflated state, together they form a uniform vent opening. For this purpose the two openings can cover one another, e.g., by being aligned with one another.

To achieve a definite positioning of each opening serving for ventilation of the flexible envelope with respect to one another, additional positioning means can be provided, e.g., by having the flexible chamber and the gas bag joined together, especially sewn together, at the openings associated with one another.

The vent opening has preferably such a cross section that on account of the gases escaping from the vent opening, no explosion-like filling of the gas bag without a few milliseconds would not be possible. In other words, accordingly the portion of the total gas flow issuing out through the vent opening is considerably less than those portions of the gas flow which are introduced into the gas bag itself through the discharge openings in the flexible chamber. Due to the outflow of gas through the vent opening into the environment, the inflation of the gas bag is not to be prevented, but merely a better adaptation to an "oops" case is to be made possible.

Of course, several vent openings can be provided in the gas bag, including "conventional" venting openings, to which the gas does not flow directly out of the flexible chamber.

The flexible chamber itself can be collapsed to form a package that can be stowed in an airbag module together with the gas bag, the flexible chamber being formed of a pliable material for the purpose. Thus the flexible chamber can consist of a woven layer or a plurality of woven layers joined together.

In a preferred embodiment of the invention the flexible chamber is of channeled construction and has two discharge openings lying opposite one another through which the gas can flow into the gas bag. For a fined control of the gas flow, the two discharge openings can be of different size, so that a tapering shape of the chamber results, for example, having two different discharge openings arranged at the end.

In a further development of the invention, the flexible chamber is so arranged and configured that due to the secondary gas flow induced by a collision of an occupant with the gas bag, a section of the flexible chamber comes in front of the at least one vent opening so as to prevent or reduce any further escape of gas into the environment (depending on whether the vent opening is partially or completely covered). Thus it can be brought about that, after the occupant has struck against the gas bag, the outflow of gas into the environment is again reduced. Thus any excessively rapid collapse of the bag is to be prevented.

The shutting of the venting opening(s) by the wall of the flexible chamber at the beginning of the inflation of the gas bag is prevented by the greatly elevated pressure within the flexible chamber. Since the pressure within the flexible chamber is higher than in the remaining areas of the gas bag outside of the flexible chamber, any deformation of the flexible chamber that might lead to a covering of the vent opening(s) is prevented.

Furthermore, additional (mechanical) means can be provided which counteract any shutting off of the vent openings by the flexible chamber. These means are preferably configured such that, when a certain pressure is reached within the gas bag, the closing of the vent opening is no longer prevented.

The additional means can be formed, for example, by an inflation control seam by which the gas bag and the flexible chamber are joined together, and which breaks open when a preset stress is exceeded. Only in this way is deformation of the flexible chamber made possible, which can lead to a partial or complete closing of the vent opening(s). This stress is produced by a corresponding application of force caused by the internal pressure in the gas bag.

In another embodiment the additional means are formed by an elongated connecting piece which binds the flexible chamber to the gas bag and by which the position of the flexible chamber can be controlled according to the shape (e.g., the unfolding or intrusion state) of the gas bag and the internal pressure of the gas bag.

Additional features and advantages of the invention will be made clear in the following description of an embodiment with the aid of the figures.

In another variant of the invention, the flexible chamber forming a flexible diffuser in the airbag arrangement is defined by a circumferential surface of flexible material, at least one aiming opening is provided in the circumferential surface, through which, in the case of a proper installation of the airbag arrangement in a motor vehicle, gas can be introduced into the gas bag in a direction away from the vehicle's protected occupants.

Especially in a so-called "oops" case, in which the occupant is not in his normal seated position but is very close to the airbag arrangement, this prevents him from being too severely stressed and thereby injured by the deploying gas bag. Instead, since the gas flow is aimed away from the protected occupant, the deploying gas bag "seeks" a gap between the occupant and the vehicle's environment in which it can deploy.

The airbag arrangement configured in the manner described above is suitable especially for use in a side airbag module which serves to protect a vehicle's occupant against being thrown against the side of a motor vehicle. Such a side airbag module is arranged and housed for example in a car door or on a side of a vehicle's chair.

The at least one aimed opening is preferably arranged in the mantle surface of the flexible diffuser such that the gas flowing through it into the gas bag to inflate it has a component directed at the side of the body of the vehicle as well as a component directed along the side of the vehicle body. Thus it can be achieved that the principal plane of deployment of the gas bag extends substantially parallel to the side of the vehicle body and thus approximately perpendicular to the direction of the gas bag's action, which counteracts the collision of a vehicle's occupant against the side of the vehicle body.

The aimed opening itself can be of circular, polygonal or even elongated to a slot, and preferably slanted toward the side of the vehicle body.

If necessary a plurality of aimed openings can be provided in the periphery of the flexible diffuser. Furthermore, the flexible diffuser can have an additional discharge opening at each of its axial ends, through which gas can be admitted into the gas bag perpendicularly to the direction of action of the gas bag. The flexible diffuser is for this purpose arranged preferably along the vertical vehicle axis in a motor vehicle.

A special advantage of the invention is that, due to reducing the stress on a vehicle's occupant in an "oops" case, the protective potential of the airbag arrangement is not limited in the normal case, i.e., in the case of a vehicle occupant who is in the normal position. For this protective potential is determined mainly by the vent openings in the gas bag by which particularly the speed of deployment of the gas bag under normal conditions can be established. Due to the possibility of determining the protective potential of the gas bag on the one hand and its performance in an "oops" case, largely independently of one another, the result is greater freedom in the optimization of the corresponding properties as well as a simplification of the gas bag's deployment.

In an "oops" case the vehicle occupant is thus merely pushed away by the deploying gas bag, but not directly stressed by it.

BRIEF DESCRIPTION OF THE DRAWINGS

FIG. 1b a cross section through the subject of FIG. 1a;

FIG. 4a a deploying side airbag, when a child situated away from his normal sitting position interferes with the deployment;

FIG. 4b a deploying side airbag, while a normal occupant situated away from his normal sitting interferes with the deployment;

FIG. 5b a schematic representation of the operation of the airbag arrangement of FIG. 5a;

DETAILED DESCRIPTION

Figure 1A:
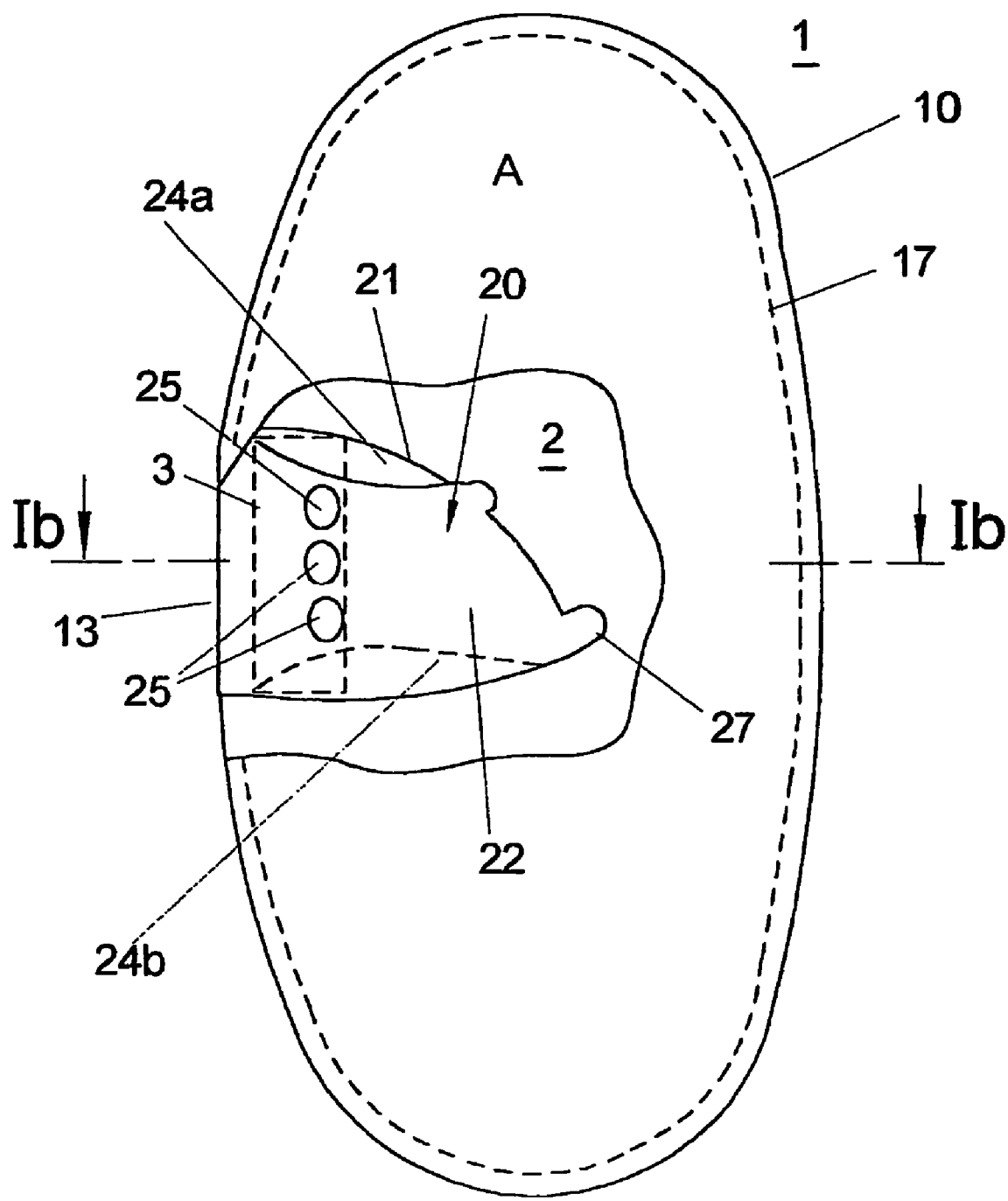
FIG. 1a is a view of a gas bag for an airbag arrangement, shown partially in section, wherein a flexible chamber defined by a flexible envelope is arranged within the gas bag.
Figure 1B:
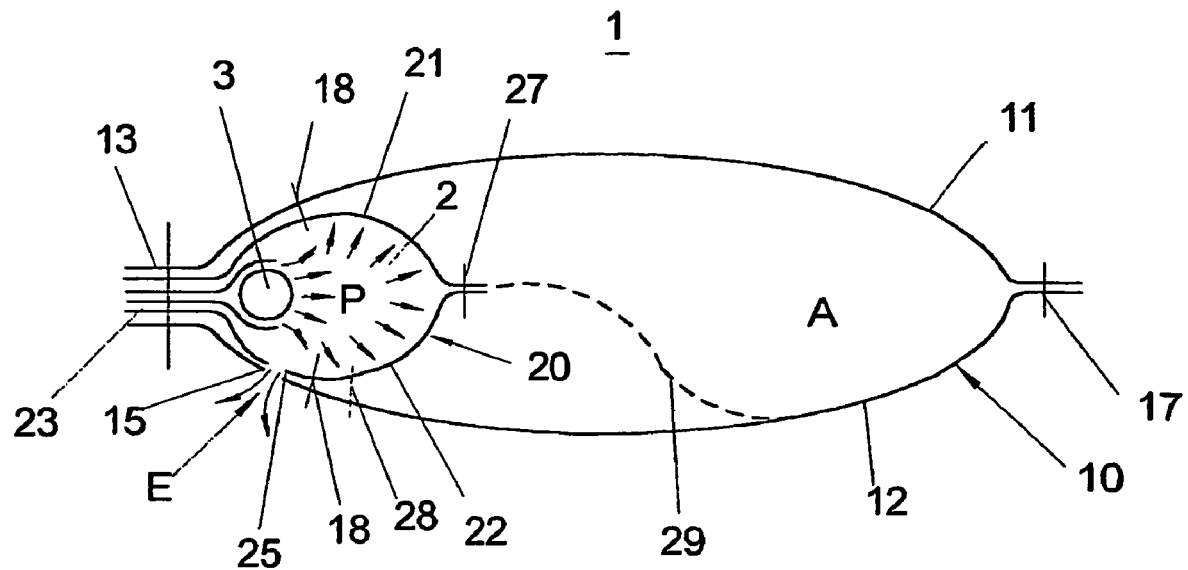

In FIGS. 1a and 1b there is shown a gas bag 1 of an airbag module in the inflated state. The gas bag is formed by a gas bag envelope 10 which consists of two fabric plates 11 and 12 sewn together along a seam 17.

The gas bag 1 has an opening 13 in the envelope 10, through which a gas generator 3 is introduced into the gas bag 1. The gas generator serves to release a gas by which the gas bag 1 can be inflated and can be brought to the inflated state represented in FIGS. 1a and 1b.

The gas generator 3 is additionally enveloped by a flexible chamber 2 whose flexible envelope 20 is formed by two fabric layers sewn together by a seam 27. The chamber 2 accordingly forms an inner gas bag (flexible diffuser) which accommodates the gas generator 3. The flexible chamber 2 has an opening 23 corresponding to the opening 13 of the gas bag 1 for the introduction of the gas generator 3. These two openings 13 and 23 are enclosed in the assembled state of the gas generator, e.g., by appropriate clamping plates.

The flexible chamber 2 forms a passage which is open at both of its opposite ends, where it has discharge openings 24a and 24b. Through these two discharge openings the gases flowing from the gas generator 3 into the flexible chamber 2 (diffuser chamber) pass finally into the working chamber A of the gas bag 1.

By the flexible chamber 2 a considerably reduced volume (in comparison to the volume of the working chamber A of the gas bag 1) defined by the envelope 20 of the flexible chamber is formed, which upon the inflow of the gases from the gas generator 3 results in a correspondingly great pressure increase. This pressure p acts upon the envelope 20 of flexible chamber 2 formed by the fabric layers 21, 22.

This leads especially also to a higher pressure (compared to gas bag 1 without flexible chamber 2) in the area of the outlet openings 24a, 24b of the flexible chamber 2 and thus to an altered flow characteristic when the gas bag 1 is filled. This flow characteristic can furthermore be influenced by the size (cross section) of the outlet openings 24, 24b. In the present case the one outlet opening 24a of the flexible chamber 2 has a smaller cross section than the other, opposite outlet opening 24b. The flexible chamber thereby assumes a tapered shape in the case of the substantially circular configuration of the outlet openings 24a, 24b. Thus the flow of the gases flowing into the working chamber A of the gas bag 1 can deliberately be adjusted so that optimum conditions are assured with regard to the protection of an occupant colliding with the gas bag 1. In particular, a rapid filling of the gas bag into the gas bag areas especially important for the protection of an occupant.

Also, by means of the flexible chamber 2, a strengthening of the gas flow can be achieved, which escapes into the environment from the gas bag 1 through a vent opening E. In the case of a gas bag for an airbag module it is basically necessary to permit the gases to escape after the gas bag has inflated. In the present case a targeted intensification of this effect is to be obtained so that the gas bag 1, despite its especially rapid filling with gas, presents but a very slight hazard for a vehicle occupant who is leaning sideways or toward the gas bag.

In the case of a side airbag, like the one shown in FIGS. 1a and 1b, such problems can arise mainly when a vehicle occupant is leaning against the door liner of the vehicle in the area of the airbag module, or is lying asleep on a rear bench. This applies especially to children. In such a case, the speed of the deployment as well as the final volume of the gas bag are to be limited by the intensified outflow of gas through the vent opening E, in order to limit the danger of injury to the occupant by the deploying gas bag.

For this purpose, in this embodiment, according to the invention three of the openings 15 serving as vents in the envelope 20 of the gas bag 1 are associated each with a corresponding opening 25 serving for venting in the envelope 20 of the flexible chamber 2. The openings 15 and 25 associated with one another in the envelope 10 of the gas bag 1 on the one hand and the flexible envelope 20 of chamber 2 on the other coincide with one another when chamber 2 is in the inflated state, so that a single vent opening E is formed through which gas can escape to the environment.

The openings 25 serving as vents in the envelope 20 of the flexible chamber 2 have each a cross section several times smaller than the vent openings 24a, 24b.

On account of the elevated gas pressure p within the flexible chamber 2, the outward flow of the gas (compared with a gas bag 1 without flexible chamber 2) is intensified. Thus, as set forth above, the danger of injury to an occupant of the vehicle in case of collision is reduced by the gas bag.

It is crucial for this that the flexible chamber 2 defines the direct discharge area of the gas generator 3 and thus produces a local pressure increase, and that in the envelope 20 of the flexible chamber 2 at least one opening 25 serving for venting is provided, which permits a direct outflow of the gas into the environment (through a corresponding opening 15 in the envelope of the gas bag 1) without having the gas flow first through the outflow openings 24a, 24b, provided for the purpose, into the working chamber A of the gas bag 1.

The positioning of the openings 15 and 25 associated with one another is accomplished by the fact that the envelope 20 of the flexible chamber 2 is connected by means of seams 18 in the area of these openings 16, 25, to the envelope 10 of the gas bag 1.

To prevent the useful life of the inflated gas bag 1 from being unduly shortened due to the accelerated escape of gas to the environment, i.e., prevent it from collapsing too quickly, the flexible chamber 2 can be arranged-and fastened within the gas bag 1 such that, when the secondary gas flow occurs when an occupant collides with the gas bag 1, the envelope 20 of the flexible chamber 2 will be pushed in front of the openings 15 that serve for venting in the envelope 10 of gas bag 1 such that these openings 15 are wholly or partially closed. This can be seen in FIG. 2, where the impact of body part K of an occupant against the gas bag 1—disposed in front of a side structure S of a vehicle—and the deformation of the gas bag 1 in the corresponding area of envelope 10 are represented. This induces a gas flow (so-called secondary gas flow) within the gas bag 1, which results in the deformation of the envelope 20 as shown in FIG. 2, and thus in the closing of the vent openings E.

At the start of the inflation of gas bag 1 (by the primary gas flow issuing from the gas generator 3) this effect is prevented by the fac that within the flexible chamber 2 a substantially greater pressure prevails than outside of this chamber 2. This counteracts any deformation of the chamber by a secondary gas flow.

Figure 2:
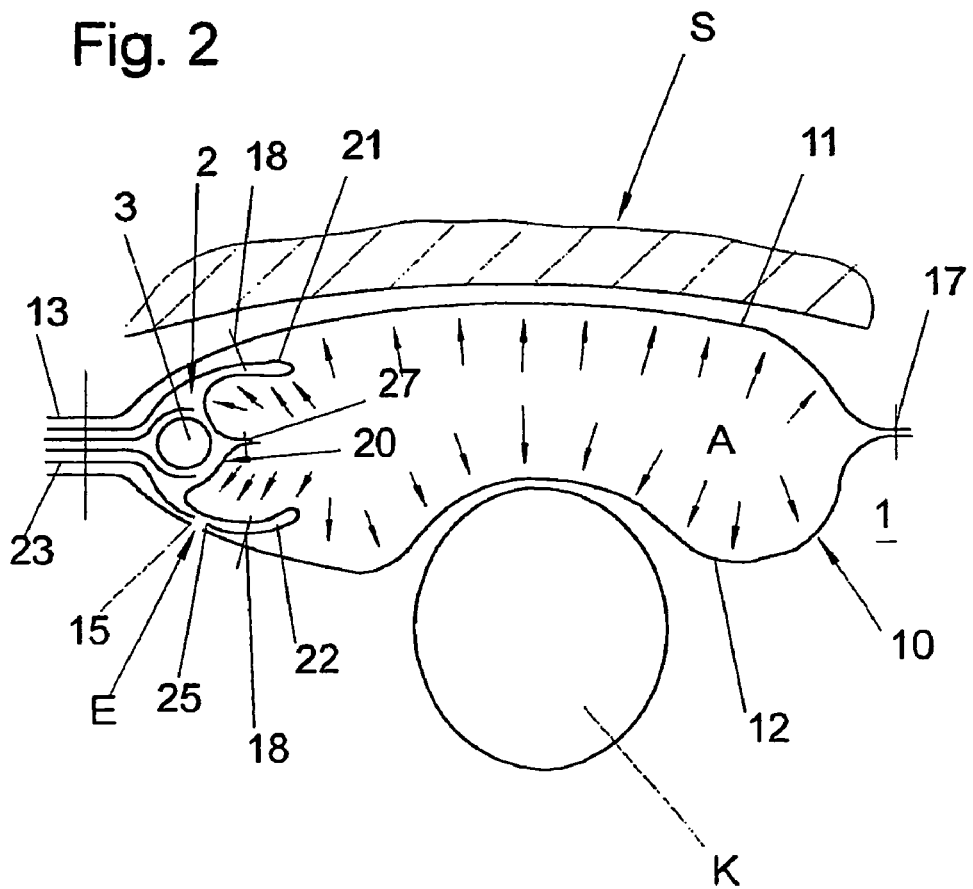
FIG. 2 the gas bag of FIGS. 1a and 1b during impact by a passenger.

Furthermore, provision can also be made for the envelope 20 of the flexible chamber to be joined additionally to the envelope 10 of gas bag 1 by a tear seam 28 or other weakening point such that the deformation, represented in FIG. 2, of the flexible chamber 2 (which leads to the closing of the vent openings E) is impossible for as long as the tear seam 28 (weak point) is intact. Only when the tear seam breaks in the case of a specific stress (triggered for example by a specific internal pressure in the gas bag), can the closing of the vent openings E described with the aid of FIG. 2 occur. Thus it is assured that, when the inflation of gas bag 1 begins, an intensified escape of gas occurs through the vent openings E, in order to limit the speed of deployment and the unfolded volume of the gas bag.

In an alternative embodiment, as indicated in FIG. 1b, the flexible chamber 2 can be additionally joined to the envelope of gas bag 1 by a connecting means 29, e.g., in the form of a fabric strip. The position of the flexible chamber 1 can then be specifically controlled.

Figure 3:
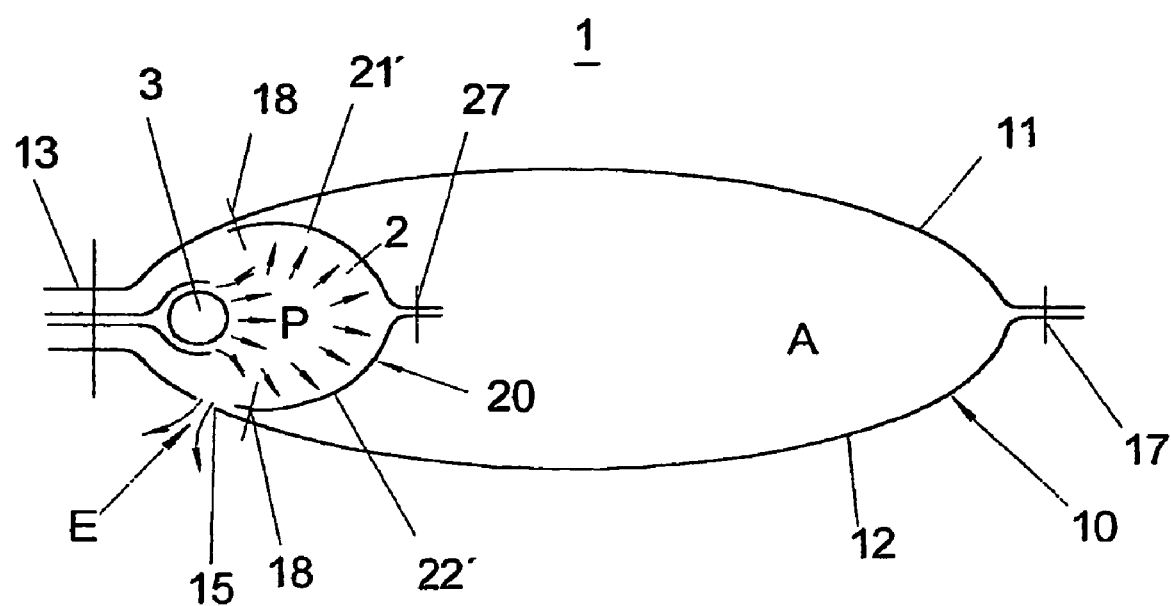
FIG. 3 a variant of the gas bag of FIGS. 1a and 1b, wherein a flexible chamber arranged within the gas bag is defined partially by the envelope of the gas bag and partially by a flexible envelope arranged within the gas bag.

In FIG. 3 a variant of the gas bag of FIGS. 1a to 2b is represented, wherein the difference consists in the fact that the flexible chamber 1 is not entirely formed by the flexible envelope 20 disposed within the gas bag, but is partly formed by the flexible envelope 20 and partly by the envelope 10 of the gas bag 1 itself.

The two stitched-together fabric layers 21N, 22N, which form the flexible envelope 20, are made for the purpose such that they only partially define the flexible chamber 2, and that the flexible chamber is otherwise defined by the two fabric plates 11 and 12 of the envelope 10 of gas bag 1.

Also, provision is made especially according to FIG. 3 so that in the area of the vent opening E a plate 12 of the envelope 10 of the gas bag 1 forms the limit wall of the flexible chamber 2. Thus the vent opening E is here formed exclusively by an opening 15 in the envelope 10 of gas bag 1.

FIGS. 4a and 4b show a possible arrangement of a gas bag 1 configured according to the invention on a seat part, especially a backrest L of a chair, namely on a side of the motor vehicle facing the side structure S (e.g., an inner liner of a door).

The gas bag 1 is defined by an envelope 10 and has in its interior a flexible chamber 2 which is partially defined by a flexible envelope 20 disposed within the gas bag 1 and partially by the envelope 10 of the gas bag 1 itself. With the flexible chamber 2 there is associated a vent opening E through which gas issuing from the gas generator 3 into the flexible chamber can escape into the environment. The vent opening E is arranged such that, when the gas bag 1 is in the inflated state, it faces the side structure S of the vehicle's door.

FIG. 4a shows a gas bag 1 inflated due to a collision, in a state in which this deployment is prevented by a child C resting against the side structure S located outside of his normal seated position. Thus gas flows more intensely out through the vent opening E so as to prevent injury to the child C by the deploying gas bag 1.

FIG. 4b shows a collision case in which the already deployed gas bag restrains a passenger who has already been displaced outwardly by the lateral collision. Also, according to FIG. 4b the side structure S of the vehicle is shifted inwardly (toward the car's interior) by forces F produced by a lateral impact S. Thus the vent openings E are partly or entirely closed. Therefore more gas is available in the airbag to restrain the passenger.

In a case of a collision in which the side structure of the motor vehicle is shifted toward the occupant, a rapid deployment of the gas bag is desired even in the case of a rider situated away from his normal seated position, so as to prevent the occupant from colliding with the vehicle's structure.

Additional details on the operation of the vent opening of an airbag system according to load conditions are described in DE 100 18 170 A1, to the fall content of which reference is made.

Figure 5A:
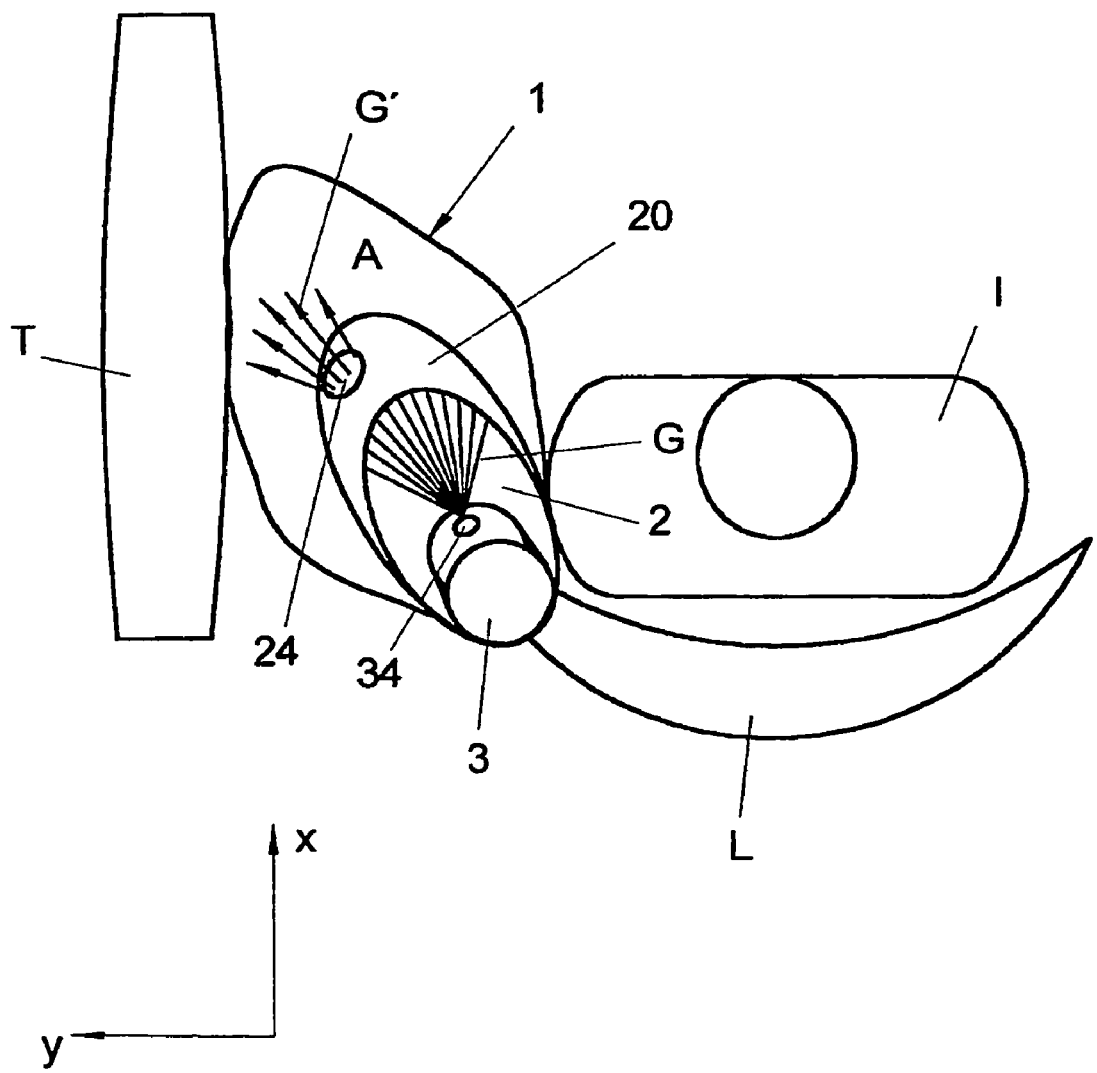
FIG. 5a a schematic representation of an airbag arrangement with a gas bag, a flexible chamber arranged within the gas bag and having in its envelope surface an aiming opening for the purpose of directing the gas flow away from the occupants when the gas bag is inflated.
Figure 5B:
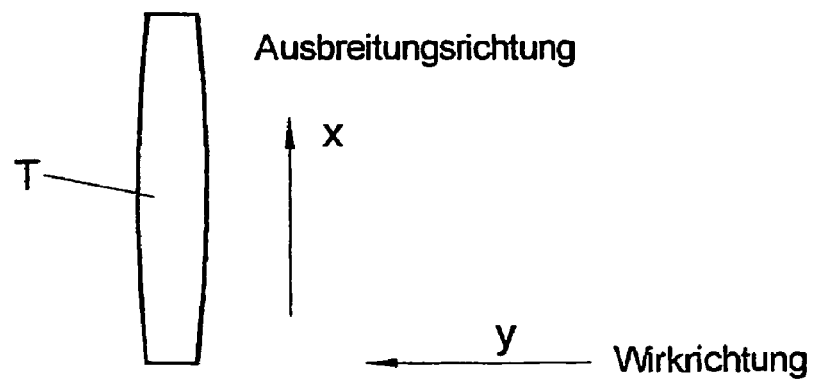
Figure 5C:
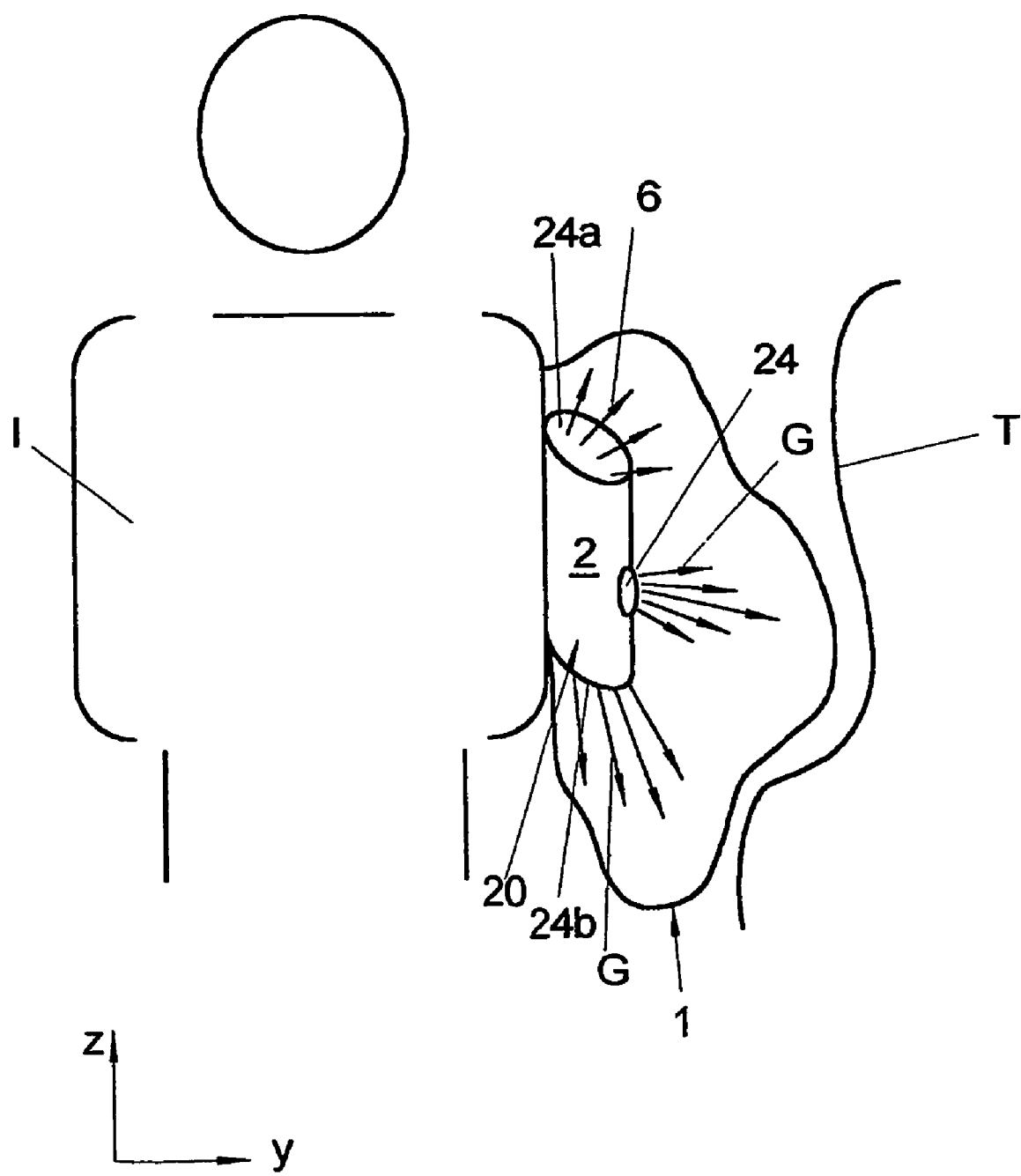
FIG. 5c a frontal view of a vehicle's occupant situated beside the deploying airbag arrangement.

In FIGS. 5a and 5c, a vehicle occupant I is represented, who has taken his place on a car seat with backrest L, and is situated next to a part of the side of the vehicle, namely a car door T. To protect this occupant from being thrown against parts of the car door T in a collision, an airbag system is contained in the side of the back rest L, and contains a gas bag 1, a gas generator 3 disposed within the gas bag 1 for the inflation of the gas bag 1, as well as a flexible chamber enveloping the gas generator 3 in the form of a diffuser 2 for the targeted introduction of the gas G issuing from the gas generator 3 into the gas bag Ito inflate it.

The diffuser 2 has a flexible envelope 20 configured as a cover with a substantially oval base surface which is open at both its cover surfaces, i.e., it forms there the vent openings 24a, 24b. The flexible diffuser 2 and the gas generator 3 are disposed on the back rest L such that they extend each along the vertical axis z of the vehicle. The gases issuing from the lateral openings 24a, 24b, of the diffuser are therefore deflected upward and downward as they flow into the working space A of the gas bag 1 along the vertical axis z of the vehicle.

Additionally, in order to direct the gas stream issuing from the gas chamber in the envelope 20 of the flexible diffuser 2, an aiming opening 24 is provided, which faces at an angle the car door T in the side of the car body. Through this aiming opening 24 the gas flow G is introduced into the work chamber A of the gas bag 1 to inflate it, such that the gas stream has one component in a direction y along the transverse axis of the vehicle (across the direction x of the length of the vehicle as well as across the vertical axis z) as well as a component x in the direction of the length of the vehicle (corresponding to the direction of travel). The gas stream G issuing from this aiming opening 24 thus flows in a direction away from the occupant I to be protected, and at the same time supports the unfolding of the gas bag 1 in the vehicle's forward longitudinal direction x. Overall, due to the lateral discharge openings 24a, 24b and the additional aiming opening 24 of the flexible diffuser 2, it is brought about that the gas bag 1 deploys substantially in a plane parallel to the door's plane T, and thus perpendicular to the direction of action of the inflated gas bag 1, which is intended to prevent the occupant I from colliding with that of the vehicle door I in the vehicle's transverse direction y. In this case the gas stream G guided from the diffuser 2 into the gas bag 1 is reliably prevented from having a component directed against the vehicle's occupant, which in an "oops" case might result in injury to the occupant by the expansion of the gas bag against him.

Instead, according to FIGS. 5a and 5c, the gas generator 3 with the diffuser 2 is arranged in the side area of the back rest L directly beside the occupant to be protected, and the deployment of the gas bag 1 takes place between the occupant I and the vehicle door T substantially parallel to the plane of the door, with an additional component away from the occupant toward the vehicle's door T. Any direct deployment of the gas bag 1 toward the occupant is thereby prevented, and indeed on the one hand by the prescribed deployment direction of the gas bag 1 and on the other hand by arranging the gas generator 3 with the flexible diffuser 2 which shields the car's occupant partially from the deploying gas bag.

The unfolding gas bag 1 "is seeking," in the arrangement described in FIGS. 5*a* to 5*c*, a gap between the vehicle's occupant I and its door T into which it can enter; however, any direct deployment of the gas bag toward the occupant I is prevented. Instead, in an "oops" case, in which he is out of his normal seated position and too close to the car door T, he is only nudged away by the opening gas bag 1 without becoming directly impacted by the latter.

This operation of the airbag arrangement represented in FIGS. 5*a* and 5*c* is illustrated by FIG. 5*b*. The gas bag 1 spreads substantially when inflated, substantially into the door plane, i.e., in the vehicle's lengthwise direction x as well as along the vehicle's vertical axis z. This principal direction of expansion is perpendicular to the direction of the action of the gas bag, which is intended to prevent any collision of the occupant I against the vehicle door T along the vehicle's transverse axis y. The spreading out of the gas bag upon deployment perpendicular to the main plane of deployment (plane x-z) is in this case prevented by the fact that any deployment of the gas bag 1 toward the occupant I is substantially excluded on account of the above-described directing of the gas stream G by the diffuser 2. In the opposite direction, namely toward the vehicle door T, any greater expansion of the gas bag is limited by the available space, since the lateral portions of the back rest of an automobile seat are closely beside the particular side door of the vehicle.

In FIGS. 6*a* to 6*f*, different arrangements of one or more aiming openings on the shroud-like envelope 20 of the diffuser 2, namely in a non-perspective view in each case from the front end of a motor vehicle.

Figure 6A:
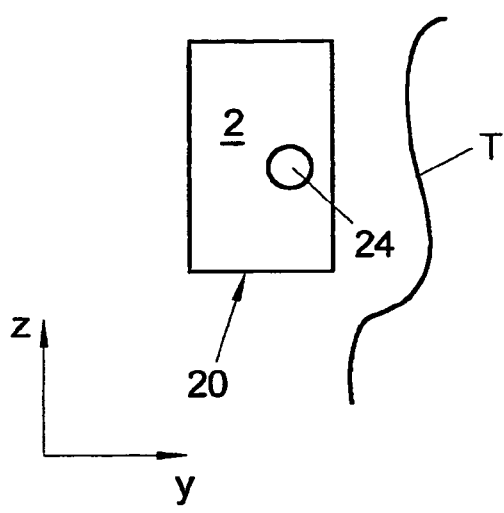
FIG. 6a to 6f different embodiments of an aiming opening for use in an airbag arrangement according to FIGS. 5a to 5c.

In FIG. 6*a* is shown the arrangement of an aiming opening in the embodiment of FIGS. 5*a* and 5*c* is shown in a front view.

Figure 6B:
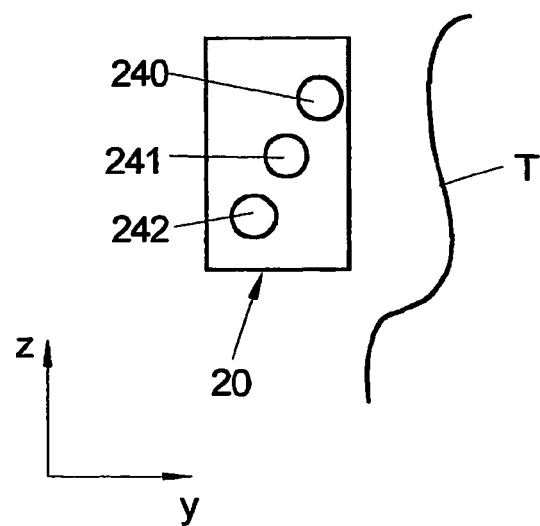
Figure 6C:
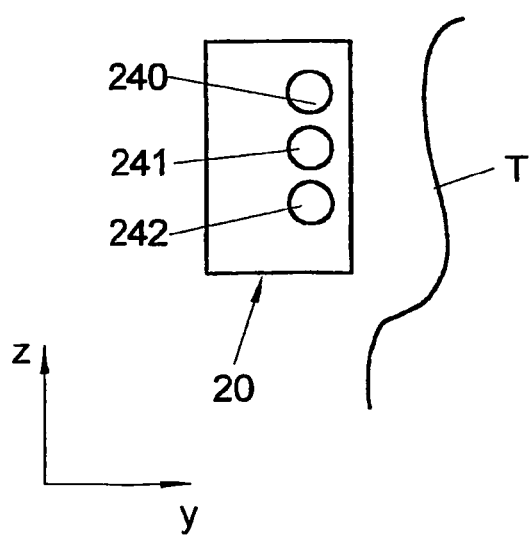
Figure 6D:
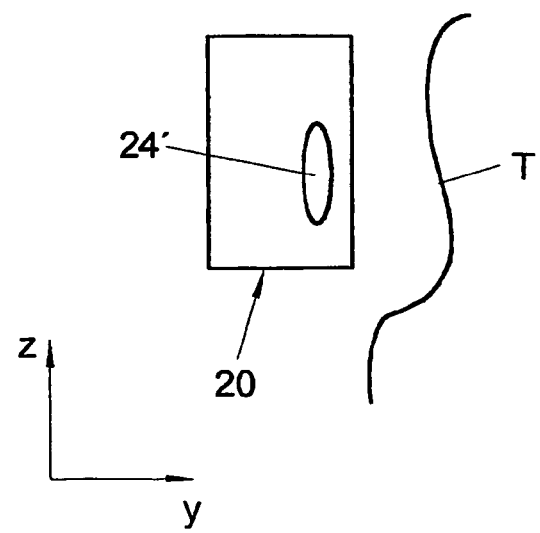

In the embodiment in FIG. 6*b* there are three aiming openings in all, 240, 241 and 242 arranged in the envelope 20 of the diffuser, one over the other along the vertical axis z of the vehicle and offset from one another in the direction of the transverse axis y of the vehicle. In the embodiment according to FIG. 6, the three aiming openings 240, 241 and 242 are arranged directly one over the other along the vertical axis z of the vehicle. In both cases it is brought about by the plurality of aiming openings 240, 241 and 242, in comparison with the embodiment in FIG. 6*a*, that the gas stream issuing from the gas generator is guided more intensely in a forward direction toward the door T. This can be achieved also, according to the embodiment in FIG. 6*d*, by configuring the aiming opening 24N as a slot extending along the vertical axis z.

Figure 6E:
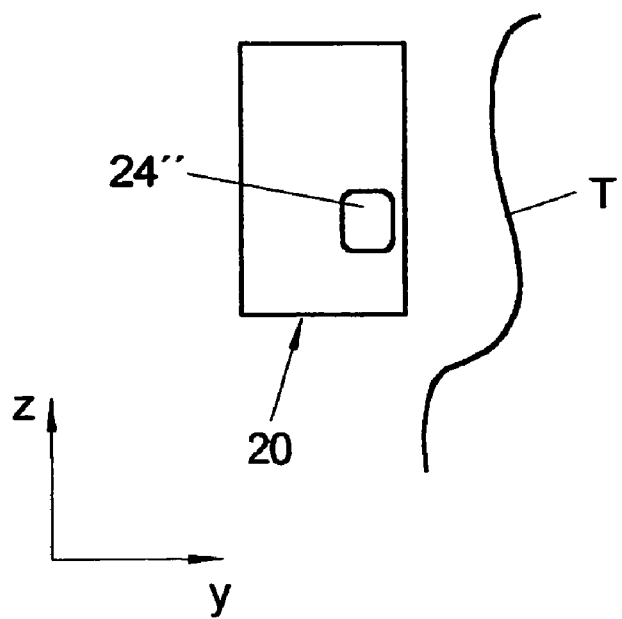

In FIG. 6*e* is shown an aiming opening 2NN with a rectangular opening cross section.

Figure 6F:
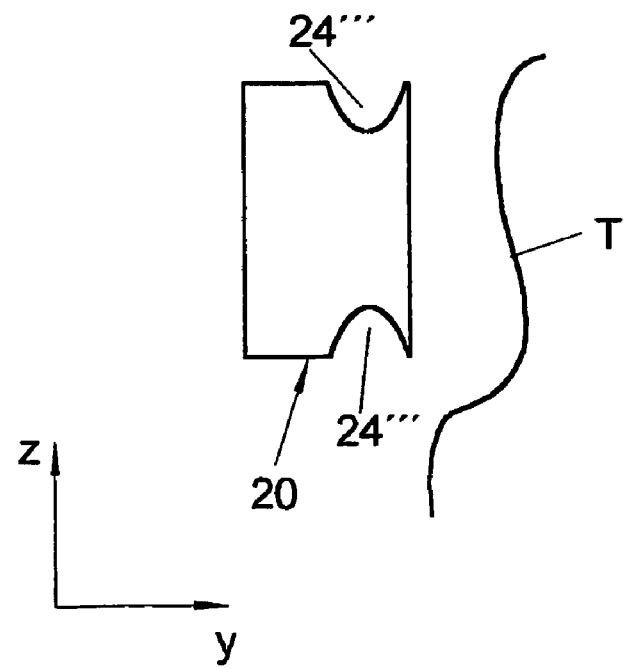

FIG. 6*f* shows a flexible envelope 20 of a diffuser in which two aiming openings 24NNN are provided at the axial ends of the flexible envelope 20, these aiming openings 24NNN merging directly into the lateral outlet openings 24*a*, 24*b*.

Figure 7A:
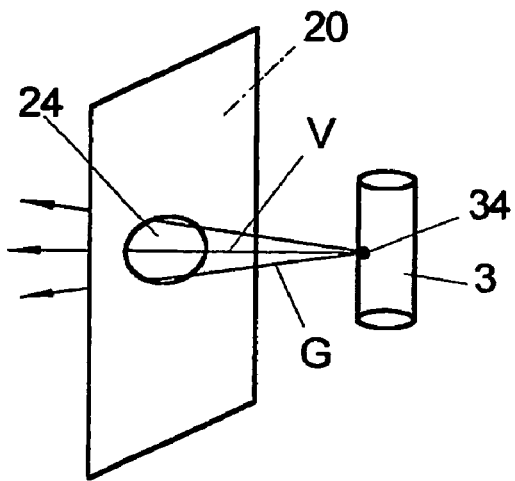
FIG. 7a to 7c a schematic representation of the cooperation of the gas generator of the airbag arrangement of FIGS. 5a to 5c with the aiming orifice in the flexible diffuser.
Figure 7B:
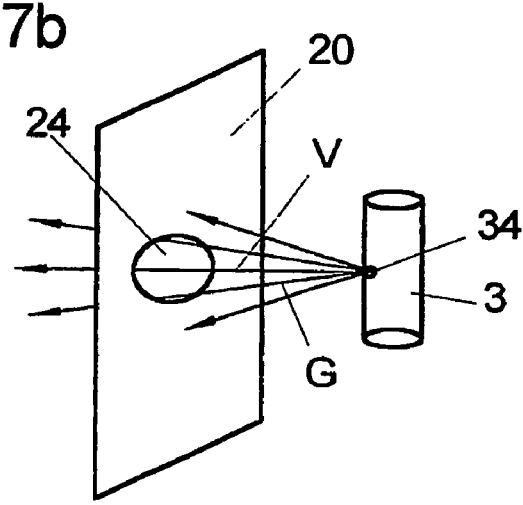
Figure 7C:
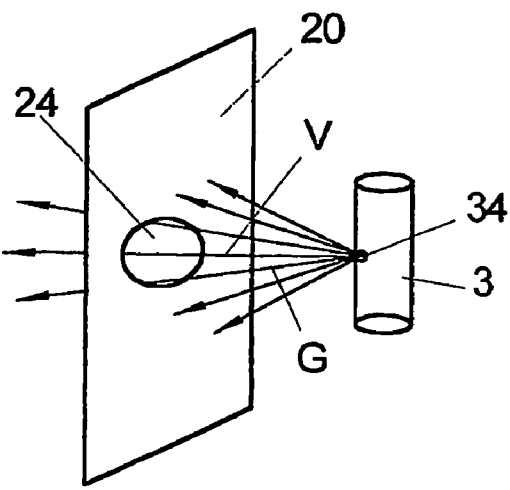

With the aid of FIGS. 7*a* to 7*c* it becomes clear that the gas aiming opening(s) 24 in the mantle surface 20 of the diffuser can act at the same time as filters with regard to the speed of propagation of the gas stream G and can counteract the scattering of the gas stream G caused by their manufacture. The gas aiming opening 24 represented in FIGS. 7*a* to 7*c* admits only that portion of the gas stream G to direct entry into the inflating gas bag which runs within a certain angle about the direct connecting line V between the corresponding outlet opening 34 of the gas generator 3 and the center point of the aiming opening 24.

What is claimed is:

1. Airbag arrangement having
    a gas bag,
    a gas generator for inflating the gas bag,
    a flexible chamber disposed within the gas bag, into which the gas issuing from the gas generator enters and which has at least one outlet opening through which the gas is led into the gas bag in order to inflate the gas bag, and
    at least one vent opening through which gas issuing from the gas generator flows out of the gas bag into the environment,
    wherein, the vent opening is disposed so that gas from the flexible chamber reaches the vent opening without passing through the at least one outlet opening of the flexible chamber.

2. Airbag arrangement according to claim 1, wherein gas from the gas generator entering into the flexible chamber flows out through the vent opening without first having flowed into an area of the gas bag that is situated outside of the flexible chamber.

3. Airbag arrangement according to claim 1, wherein the vent opening is disposed in a wall of the flexible chamber.

4. Airbag arrangement according to claim 1, wherein the flexible chamber is defined by a flexible envelope disposed within the gas bag against the other areas within the gas bag.

5. Airbag arrangement according to claim 4, wherein the wall of the flexible chamber is formed exclusively by the flexible envelope disposed within the gas bag.

6. Airbag arrangement according to claim 4, wherein the wall of the flexible chamber is formed partially by the flexible envelope disposed within the gas bag and partially by the envelope of the gas bag.

7. Airbag arrangement according to claim 4, wherein the vent opening is formed exclusively by an opening in the envelope of the gas bag.

8. Airbag arrangement according to claim 4, wherein the vent opening is formed by an opening in the envelope of the gas bag and an opening in the flexible envelope.

9. Airbag arrangement according to claim 8, wherein gas from the flexible chamber enters through the opening in the flexible envelope into the associated opening in the envelope of the gas bag without passing the outlet openings of the flexible chamber.

10. Airbag arrangement according to claim 9, wherein the opening serving for venting in the flexible envelope and the associated opening in the envelope of the gas bag overlap one another in the inflated state of the flexible chamber.

11. Airbag arrangement according to claim 10, wherein the two openings serving for venting align with one another.

12. Airbag arrangement according to claim 8, wherein the opening serving for venting in the flexible envelope has such a cross section that due to the gases issuing from this opening any explosion-like filling of the gas bag with gas is impossible.

13. Airbag arrangement according to claim 12, wherein the flexible chamber is foldable in common with the gas bag.

14. Airbag arrangement according to claim 12, wherein the flexible chamber is formed by at least one fabric layer.

15. Airbag arrangement according to claim 12, wherein the flexible chamber has two outlet openings through which gas passes from the flexible chamber into additional areas of the gas bag.

16. Airbag arrangement according to claim 15, wherein the two outlet openings form opposite face sides of the flexible chamber.

17. Airbag arrangement according to claim 15, wherein the two outlet openings have cross sectional areas of different size.

18. Airbag arrangement according to claim 15, wherein the flexible chamber forms a guiding channel for the gases issuing from the gas generator.

19. Airbag arrangement according to claim 8, wherein the opening serving for venting is arranged in the flexible envelope in a side wall of the guiding passage.

20. Airbag arrangement according to claim 15, wherein the flexible chamber is so arranged and formed that due to the secondary gas flow induced by the collision of an occupant against the gas bag a section of the flexible chamber comes in front of the vent opening in order to reduce or prevent the outflow of gas into the environment.

21. Airbag arrangement according to claim 20, wherein, during the outflow of gas from the gas generator the pressure existing in the flexible chamber opposes any deformation of the flexible chamber which would lead to a closing of the vent opening.

22. Airbag arrangement according to claim 20, wherein additional means are provided with opposes any closing of the vent opening.

23. Airbag arrangement according to claim 22, wherein the additional means are controllable according to the gas pressure within the gas bag.

24. Airbag arrangement according to claim 22, wherein the additional means are configured as mechanical means.

25. Airbag arrangement according to claim 22, wherein the additional means are formed by a tear seam by which the flexible chamber is connected to the gas bag.

26. Airbag arrangement according to claim 22, wherein the additional means are formed by an elongated connecting means by which the flexible chamber is connected to the gas bag.

27. Airbag arrangement according to claim 22, wherein the capacity of the flexible chamber is a number of times smaller than the entire capacity of the gas bag minus the capacity of the flexible chamber.

28. Airbag arrangement according to claim 22, wherein the gas bag is arranged within a motor vehicle such that the vent opening points during inflation of the gas bag toward a structural element of the motor vehicle and in the case of a collision-caused displacement of the structural element is wholly or partially closed by the structural element.

* * * * *

UNITED STATES PATENT AND TRADEMARK OFFICE
Certificate

Patent No. 7,686,327 B2                                                               Patented: March 30, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Rainer Heuschmid, Kammel (DE); Georg Rasch, Bibertal Bühl (DE); Jens Feller, Illerkirchberg (DE); and Uwe Dierks, Blaubeuren (DE).

Signed and Sealed this Twenty-ninth Day of January 2013.

PAUL N. DICKSON
*Supervisory Patent Examiner*
Art Unit 3616
Technology Center 3600